Figure 4:
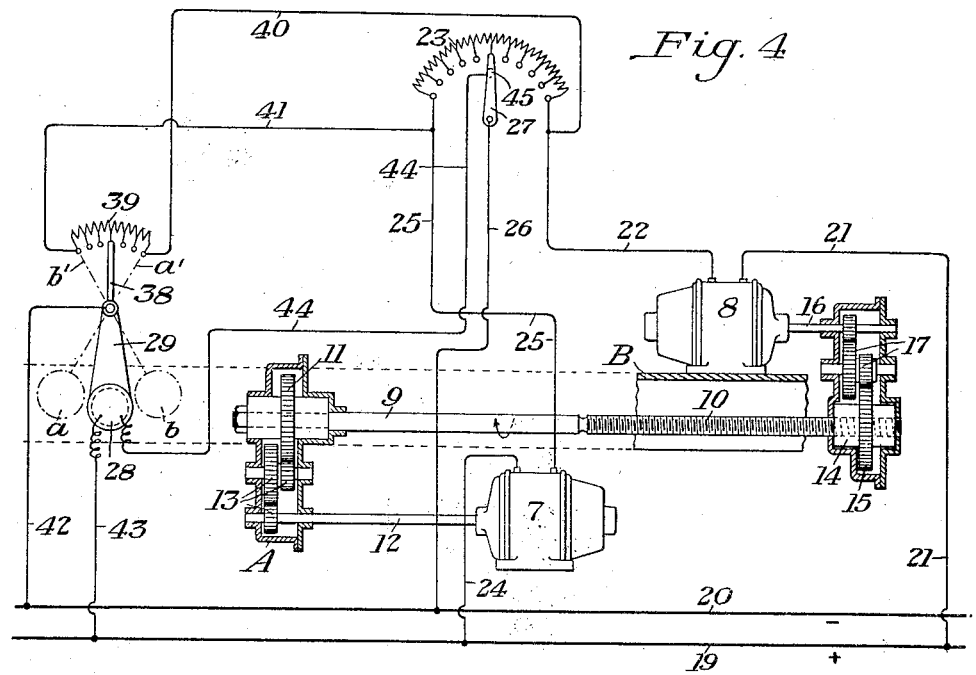

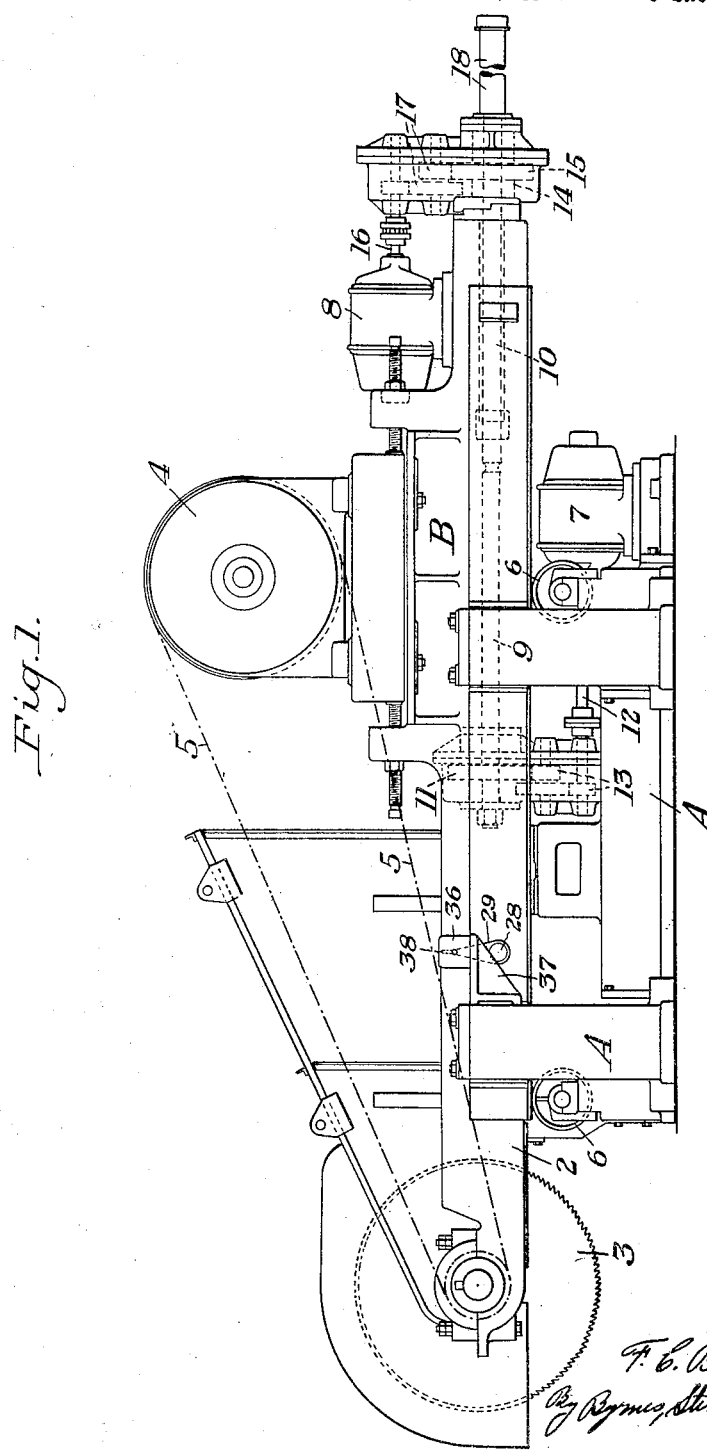

Aug. 19, 1924. 1,505,764
F. C. BIGGERT JR
TOOL CONTROL
Filed April 21, 1923 3 Sheets-Sheet 2
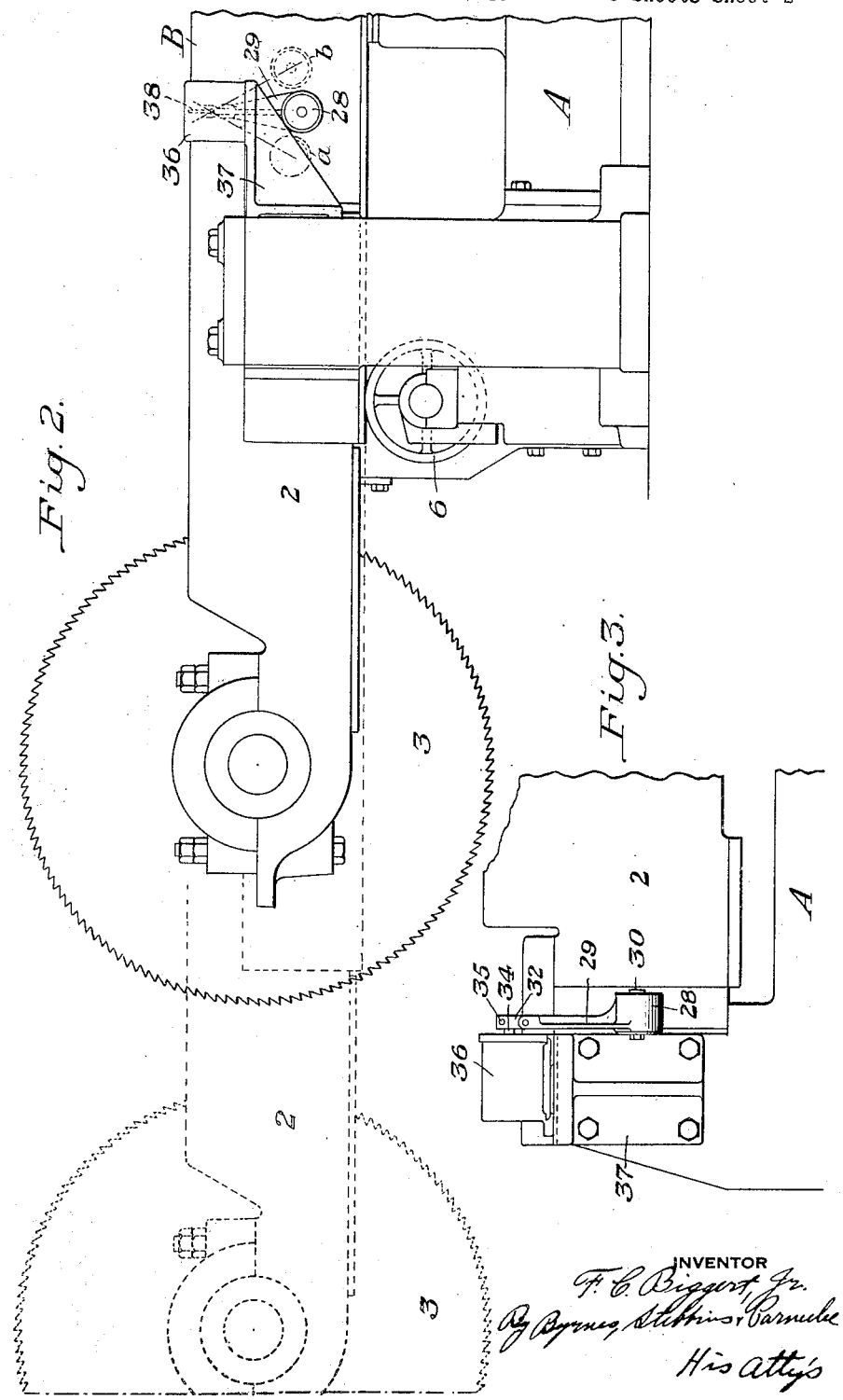

Aug. 19, 1924.

F. C. BIGGERT JR 1,505,764

TOOL CONTROL

Filed April 21, 1923   3 Sheets-Sheet 3

INVENTOR
F. C. Biggert Jr.
By Byrnes, Stebbins & Parmelee
His Attys

Patented Aug. 19, 1924.

1,505,764

UNITED STATES PATENT OFFICE.

FLORENCE C. BIGGERT, JR., OF CRAFTON, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

TOOL CONTROL.

Application filed April 21, 1923. Serial No. 633,631.

*To all whom it may concern:*

Be it known that I, FLORENCE C. BIGGERT, Jr., a citizen of the United States, residing at Crafton, county of Allegheny and State of Pennsylvania, have invented a new and useful Improvement in Tool Controls, of which the following is a full, clear, and exact description.

The present invention relates broadly to the metal-working art, and more particularly to means for preventing a movable tool-actuating member from creeping from its normal stationary position.

It is customary in the metal-working art to advance and retract a tool-actuating member by means of a pair of continuously operating electric motors, the one motor tending to move the member in one direction, and the other in the opposite direction, the construction and arrangement being such that when the motors are running at equal speeds, the tool-actuating member is held stationary. It has been found in actual practice, however, that one motor tends to speed up or slow down slightly with respect to the other, from time to time, thereby causing the tool-actuating member to creep in one direction or the other. This tendency of the tool-actuating member to creep is objectionable, and even dangerous, as a sudden variation of the speed of one motor with respect to that of the other may be sufficient to cause the tool to advance and engage the work at the wrong time, or catch an operative off his guard and injure him. The present invention aims to overcome this disadvantage by providing an automatically operating auxiliary controlling means for the motors, whereby creeping of the tool-actuating member is effectively prevented.

In the accompanying drawings, there is shown, for purposes of illustration only, one embodiment of the present invention, it being understood that the drawings do not define the limits of the invention, as changes may be made in the construction and operation therein disclosed without departing from the spirit of the invention or scope of my broader claims.

Figure 5:
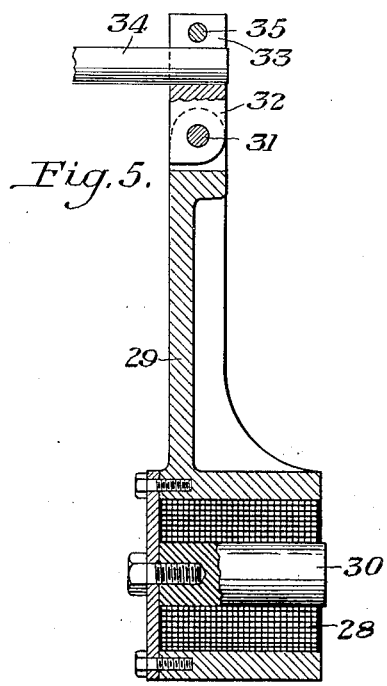
Figure 6:
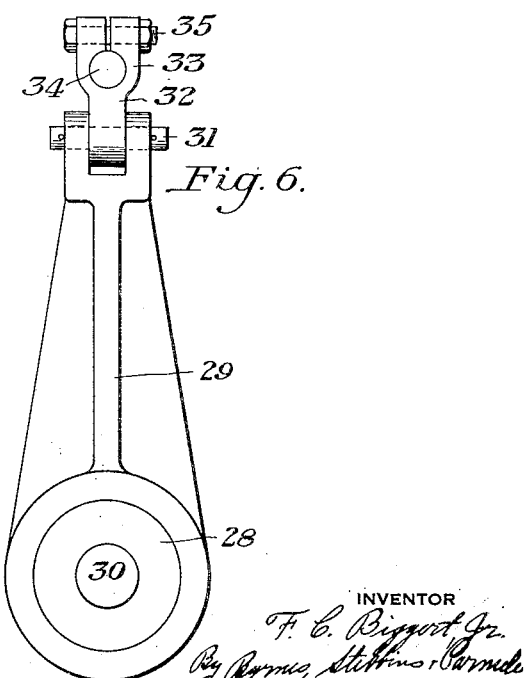

In the drawings:

Figure 1 is a side elevation of a tool mechanism embodying my invention,

Figure 2 is a side elevation of a portion of the mechanism showing the tool in retracted position in full lines and in advanced position in dotted lines, and also illustrating the normal position of the auxiliary controlling means in full lines and in dotted lines the positions which it may take when the tool-actuating member tends to creep in either direction, Figure 3 is a fragmentary front view showing the normal position of the auxiliary controlling means with respect to the tool-actuating member, Figure 4 is a view, partly in section and partly in elevation, showing the motors and the driving connections between the same and the tool-actuating member, said view also showing a diagram of the wiring connections between the motors and the main and auxiliary controls therefor, and Figures 5 and 6 are views illustrating a portion of the auxiliary controlling means in section and side elevation, respectively.

Referring to the drawings, in which I have illustrated my invention as applied to a sliding-frame cold saw, this being a well-known form of tool mechanism employed in the metal-working art, the reference character A designates the stationary base frame of the mechanism, and the reference character B the sliding frame thereof, the latter comprising the tool-actuating member 2 having journaled upon the end thereof the tool 3, which, as illustrated, may be a circular saw, it being immaterial from the standpoint of the present invention what the nature of the tool is. The tool shown may be driven from a motor 4 mounted in the frame B, through a belt 5.

The frame B, with the parts carried thereby, is mounted for reciprocation in the frame A in order to advance and retract the tool, the frame A having anti-friction rollers 6 journaled therein for affording rolling supporting surfaces for the frame B.

The frame B is adapted to be reciprocated by means of a pair of electric motors 7 and 8, the motor 7 being mounted in the frame A and the motor 8 in the frame B. Referring particularly to Figure 4, journaled in the frame A is a shaft 9 having one end portion 10 thereof screw-threaded.

Fixed upon the unthreaded end of the shaft 9 is a gear 11, and connecting the gear 11 with the driving shaft 12 of the motor 7 is a train of speed-reducing gears 13. Mounted upon the screw-threaded end portion 10 of the shaft 9 is a nut 14 carrying a gear 15, the latter being connected with the driving shaft 16 of the motor 8 through a train of speed-reducing gears 17. The nut 14 is carried by the frame B.

Assuming that the motor 7 is driving the shaft 9 in the direction of the arrow (Figure 4), and that the motor 8 is driving the nut 14 in the same direction, it will be apparent that if the motors are running at equal speeds, or to be more accurate, if they are rotating the parts 9 and 14 at equal speeds, the sliding frame B, and hence the tool-actuating member 2 and tool 3, will remain stationary, because the nut 14 will have no tendency to move in either direction on the screw-threaded end portion 10 of the shaft 9, and it will also be apparent that if one motor is speeded up or slowed down with respect to the other, or if one motor is speeded up and the other slowed down, or vice versa, then the frame B will be moved either in the direction to advance the tool or in the direction to retract the same. In the construction shown, it is intended that the motors 7 and 8 be continuously operated, and that when they are running at equal speeds, the tool-actuating member 2 be held stationary, and that said tool-actuating member be caused to move in one direction or the other by varying the relative speeds of the motors, thereby causing the nut 14 to overrun the screw 10 or the latter to overrun the former. The frame B is provided with a tubular housing 18 to receive the screw-threaded portion 10 when the nut 14 advances on the same.

Again referring to Figure 4, the reference numerals 19 and 20 designate the mains for supplying current to the motors 7 and 8. A conductor 21 connects the main 19 with the motor 8, and a conductor 22 connects the said motor with one side of a rheostat 23. The motor 7 is connected with the main 19 through a conductor 24 and with the opposite side of the rheostat 23 through a conductor 25. A conductor 26 constitutes a common return for the motors 7 and 8, this conductor being connected at one end to the main 20, and at its opposite end to the switch member 27 of the rheostat 23. When the switch member 27 is in the neutral position shown in Figure 4, the rheostat 23 puts equal amounts of resistance in the fields of the two motors 7 and 8, so that these motors, under these conditions, should run at equal speeds, thereby maintaining the sliding frame B and tool-actuating member 2 stationary. As already stated, however, it has been found impossible to maintain the speeds of the motors absolutely equal, as one motor will tend to speed up or slow down with respect to the other, thereby causing the tool-actuating member 2 to creep in one direction or the other. I have, therefore, devised automatically operated auxiliary means for controlling the operation of the motors to prevent such creeping of the tool-actuating member.

This auxiliary controlling means may comprise an electromagnet 28 carried by a lever 29 and having a soft-iron core 30. The electromagnet 28 is arranged adjacent a side face of the tool-actuating member 2, and the lever 29 is pivoted at its upper end upon a pin 31 extending parallel to the longitudinal axis of the tool-actuating member 2, so that when the electromagnet 28 is energized, mutual attraction will be set up between the soft-iron core 30 and the member 2, causing the lever 29 to swing toward the member 2 and the core 30 to be brought into engagement with said member. The pivot pin 31 for the lever 29 is carried by a hanger 32 having a split collar 33 clamped upon a short rock-shaft 34 by means of a bolt 35. The shaft 34 extends at right angles to the pivot pin 31 and is journaled within a housing 36, the latter being mounted upon a bracket 37 fixed to the frame A. The rock-shaft 34 has a switch member 38 mounted thereon, said switch member cooperating with a rheostat 39 in the housing 36, the rheostat being connected in parallel with the rheostat 23 by conductors 40 and 41. The switch member 38 is connected with the main 20 by a conductor 42, and the electromagnet 28 to the main 19 by a conductor 43, a conductor 44 connecting the electromagnet with a stationary contact 45, which is engaged by the switch member 27 when the latter is in the neutral position shown in Figure 4.

The operation of the auxiliary controlling means herein described is as follows: With the parts in the position shown in Figure 4, current passes from the main 19 to the motor 8 through the conductor 21, and from the said motor through the conductor 22, the current in the conductor 22 dividing and a portion thereof flowing through the right hand portion of the rheostat 23, through the switch member 27 and conductor 26 to the main 20, and another portion thereof flowing through the conductor 40, the right hand portion of the rheostat 39, the switch member 38 and conductor 42 to the main 20. The circuit for the motor 7 is from the main 19 through the conductor 24, and thence through the conductor 25, the current in the conductor 25 dividing, and a portion thereof flowing through the left hand portion of the rheostat 23, and through the switch member 27 and conductor 26 to the main 20, and another portion thereof flowing through the conductor 41, left hand portion of the rheostat 39, and through the switch member 38 and conductor 42 to the main 20. It will thus be apparent that with the switch members 27 and 38 in their neutral positions, the rheostats 23 and 39 put equal amounts of resistance in the fields of the motors 7 and 8, and therefore these motors should run at equal speeds. However, as before mentioned, the speeds of these motors will not remain absolutely the same at all times under these conditions. Assuming that a variation in speed of the two motors takes place, and that this variation is such that the motor 8 tends to overrun the motor 7, the nut 14 will be advanced upon the screw 10, thereby causing the sliding frame B to advance. Since the circuit through the electromagnet 28 is closed by the switch member 27, the core 30 of the electromagnet is in engagement with the member 2, so that as the latter member creeps forward, the electromagnet 28 will be carried with the member 2, and the electromagnet 28 and lever 29 may assume a position as indicated in dotted lines in Figure 4, thereby swinging the switch member 38 to the dotted line position $a'$. In this position of the switch member 38, all of the resistance of the rheostat 39 would be cut out of the field of the motor 8 and put in the field of the motor 7, thereby causing the motor 8 to slow down and the motor 7 to speed up, it being assumed that the motors are of such type that they slow down upon the strengthening of their fields and speed up upon the weakening of said fields. Of course, it will be understood that it is immaterial whether this type of motor is used or the type in which a strengthening of the field causes the motor to speed up and a weakening of the field causes it to slow down. In the latter case, the conductor 40 would be connected to the left hand side of the rheostat 39, and the conductor 41 to the right hand side thereof. Slowing down of the motor 8 and speeding up of the motor 7 in the manner described would cause the frame B to move in the opposite direction, thereby causing the electromagnet 28 and lever 29 to assume a position such as $b$, and the switch member 38 a position $b'$. This would have the effect of putting all of the resistance of the rheostat 39 in the field of the motor 8, causing the motor 8 to speed up and the motor 7 to slow down. It will be apparent that the positions $a$ and $b$ are merely given as examples, and are the extreme positions that would be assumed by the parts. Ordinarily, the switch member would merely have a slight oscillating movement, adding a small increment of resistance to the field of one motor and cutting out a corresponding amount of resistance from the field of the other motor, and vice versa, until the speeds of the motors 7 and 8 again become equal, thereby bringing the frame B to rest.

The switch member 27 constitutes the main controlling means for the motors 7 and 8, whereby when the said switch member is moved to either side of its neutral position, as shown in Figure 4, the relative speeds of the motors 7 and 8 may be varied to cause the reciprocation of the sliding frame B to move the tool to and from its operative positions. Whenever the switch member 27 is moved to either side of its neutral position, the circuit of the electromagnet 28 is opened, thereby putting the auxiliary controlling means out of operation.

The advantages of the present invention arise from the provision of auxiliary means of simple construction for preventing the unintentional movement of a tool-actuating member, thereby enabling said member to be actuated by a continuously operating means without danger of said member creeping or being moved to operative position at the wrong time.

I claim:

1. In mechanism of the character described, a movable tool-actuating member, means for moving said member in one direction to advance the tool and in the opposite direction to retract the same, and means automatically operated upon unintentional movement of said member in either direction for causing said first mentioned means to move said member in the opposite direction, substantially as described.

2. In mechanism of the character described, a movable tool-actuating member, means including a pair of separate power devices for moving said member in one direction to advance the tool and in the opposite direction to retract the same, and means automatically operated upon unintentional movement of said member in either direction for causing said first mentioned means to move said member in the opposite direction, substantially as described.

3. In mechanism of the character described, a movable tool-actuating member, means including a pair of separate power devices for moving said member in one direction to advance the tool and in the opposite direction to retract the same, and means automatically operated upon unintentional movement of said member in either direction for causing one of said power devices to move said member in the opposite direction, substantially as described.

4. In mechanism of the character described, a movable tool-actuating member, means for moving said member in one direction to advance the tool and in the opposite direction to retract the same, said means being adapted to be continuously operated, and when so operated to normally maintain said member stationary, and means automatically operated upon unintentional movement of said member in either direction for causing said first mentioned means to move said member in the opposite direction, substantially as described.

5. In mechanism of the character described, a movable tool-actuating member, a pair of separate power devices adapted to be continuously operated, one of said devices tending to move said member in a direction to advance the tool and the other of said devices tending to move said member in the opposite direction, the effect of one of said devices on said member being normally neutralized by that of the other of said devices thereon, means automatically operated upon unintentional movement of said member in either direction for causing one of said power devices to overcome the effect of the other on said member and move said member in the opposite direction, and means for producing a variation in the relative speeds of said power devices to move said tool-actuating member in the desired direction, substantially as described.

6. In mechanism of the character described, a movable tool-actuating member, electrical means for moving said member in one direction to advance the tool and in the opposite direction to retract the same, and means automatically operated upon unintentional movement of said member in either direction for causing said first mentioned means to move said member in the opposite direction, substantially as described.

7. In mechanism of the character described, a movable tool-actuating member, means for moving said member in one direction to advance the tool and in the opposite direction to retract the same, and electromagnetic means automatically operated upon unintentional movement of said member in either direction for causing said first mentioned means to move said member in the opposite direction, substantially as described.

8. In mechanism of the character described, a movable tool-actuating member, electrical means for moving said member in one direction to advance the tool and in the opposite direction to retract the same, and electromagnetic means automatically operated upon unintentional movement of said member in either direction for causing said electrical means to move said member in the opposite direction, substantially as described.

9. In mechanism of the character described, a movable tool-actuating member, a pair of electric motors adapted to be continuously operated, one of said motors tending to move said member in a direction to advance the tool and the other tending to move said member in the opposite direction, the effect of one of said motors on said member being normally neutralized by that of the other thereon, means automatically operated upon unintentional movement of said member in either direction for causing one of said motors to overcome the effect of the other on said member and move said member in the opposite direction, and means for producing a variation in the relative speeds of said motors to move said tool-actuating member in the desired direction, substantially as described.

10. In mechanism of the character described, a movable tool-actuating member, a screw, a nut cooperating with said screw, one of said cooperating members being movable with said tool-actuating member and the other of said members being held against axial movement, means for continuously rotating said screw and nut normally at equal speeds whereby said tool-actuating member is normally held stationary, means automatically operated upon unintentional variation of the speed of rotation of one of said cooperating members with respect to that of the other for causing the speed of rotation of the other of said cooperating members to be varied, and means for controlling said first mentioned means to effect movement of said tool-actuating member in the desired direction, substantially as described.

11. In mechanism of the character described, a movable tool-actuating member, a screw, a nut cooperating with said screw, one of said cooperating members being movable with said tool-actuating member and the other of said members being held against axial movement, separate electric motors for continuously rotating said screw and nut normally at equal speeds whereby said tool-actuating member is normally held stationary, means automatically operated upon unintentional variation of the speed of rotation of one of said motors for causing the speed of rotation of the other of said motors to be varied, and means for producing a variation in the relative speeds of said motors to move said tool-actuating member in the desired direction, substantially as described.

12. Tool controlling mechanism, comprising operable means adapted to be uniformly or relatively moved, said means being effective upon relative movement for producing movement of the tool, means for normally producing uniform movement of said operable means, means for effecting relative movement thereof, and means automatically operable upon unintentional relative movement of said operable means to re-establish uniform movement thereof, substantially as described.

13. Tool controlling mechanism, comprising operable means adapted to be uniformly or relatively moved, said means being effective upon relative movement for producing movement of the tool, means for normally producing uniform movement of said operable means, means for effecting relative movement thereof, and electromagnetic means automatically operable upon unintentional relative movement of said operable means to re-establish uniform movement thereof, substantially as described.

In testimony whereof I have hereunto set my hand.

FLORENCE C. BIGGERT, Jr.